United States Patent [19]
Block

[11] 3,752,002
[45] Aug. 14, 1973

[54] MECHANICAL MOVEMENT
[76] Inventor: Charles Block, 1129 Albert Rd., North Bellmore, N.Y. 11710
[22] Filed: Jan. 10, 1972
[21] Appl. No.: 216,697

[52] U.S. Cl............................ 74/404, 74/123, 74/426
[51] Int. Cl. ..... F16h 57/10, F16h 1/16, F16h 29/10
[58] Field of Search....................... 74/404, 426, 122, 74/123, 84, 113, 112, 393

[56] References Cited
UNITED STATES PATENTS
1,611,630  12/1926  Burke................................ 74/750 R
1,016,545  2/1912   Bultman.............................. 74/426
1,214,786  2/1917   Hill..................................... 74/426
2,857,787  10/1958  Natalis................................ 74/84 X
2,911,846  11/1959  Platt.................................... 74/426

Primary Examiner—Leonard H. Gerin
Attorney—Bauer & Amer

[57] ABSTRACT

A mechanical movement having a driven body and a driving body set at angles to each other. The driven body provided with teeth about its periphery and the driving body with a circular edge adapted to enter between the teeth and means for its rotation about a central axis. The edge being normally circular but having a separable end adapted to be flexed to either side of the plane of the circle. Means are provided to flex the separable edge during rotation of the driving body.

13 Claims, 10 Drawing Figures

Patented Aug. 14, 1973

Patented Aug. 14, 1973

| POSITION | SOLENOID | | | |
|---|---|---|---|---|
| | 60 | 62 | 64 | 66 |
| LEFT | ON | | ON | |
| NEUTRAL 1 | | ON | ON | |
| 2 | ON | | | ON |
| 3 | OFF | OFF | OFF | OFF |
| RIGHT | | ON | | ON |

| POSITION | PORT | | |
|---|---|---|---|
| | 84 | 86 | 88 |
| LEFT 1 | 0 | 0 | LOW |
| NEUTRAL 2 | HIGH | 0 | LOW |
| RIGHT 3 | 0 | HIGH | LOW |

MECHANICAL MOVEMENT

BACKGROUND OF DISCLOSURE

The present invention relates to apparatus for transmitting motion between mechanical elements and in particular to apparatus for converting rotary motion about one axis into intermittent or indexed rotary motion about a second axis at an angle thereto.

Various mechanical devices are known for converting rotary motion in the manner desired. Hypoid gear systems, worm gear systems, circular racks and pinions and scroll gears are but a few such devices. These devices, however, have certain disadvantages arising mainly from the fixed relationship between one element and other so that non-variable transmission ratios and speed are only obtained and reversible output action, while maintaining unidirectional input, is impossible. The advent of miniaturization of mechanical components requires the construction of small versatile multiduty devices of this nature, which also define a stepping characteristic in which the output rotation can be controlled and defined with regard to the input rotation.

It is the object of the present invention to provide an improved apparatus for the conversion of rotary motion into essentially rotary motion about a second axis.

It is another object of the present invention to provide apparatus of the type described in which reversible output rotation is obtained although the input rotation is maintained in one direction.

It is another object of the present invention to provide an improved but simple stepping motor.

These objects, as well as others, together with numerous advantages will be seen from the following disclosure of the present invention.

SUMMARY OF THE INVENTION

According to the present invention, a mechanical movement is provided having a driven body on which a plurality of teeth are arranged about its periphery and a driving body having a circular peripheral edge adapted to slidingly engage between the teeth. The peripheral edge of the driving body has a portion separable from it and adapted to be flexed out of the circular plane. The driving body is rotatable about a fixed axis and means are provided for shifting the separable portion while the driving body continues its rotation. Preferably, the driven body is in the nature of a spur gear and the driving body is a disk, having a portion separable along the periphery to define a tongue having a free leading edge.

In the preferred embodiment, the disk is mounted on a hollow shaft which is rotated about its central axis. A bracket is slidably located over the shaft and is connected to the free end of the tongue. A rod extends within the shaft and connecting means, such as a screw threaded into the bracket, extends through an axial slot in the shaft and into an annular slot in the rod. Thus, the bracket may be conjointly rotated with the shaft and disk while axially shifted by the rod.

The rod is automatically operated by electromagnetic, mechanical or fluid actuators arranged to incrementally shift the rod to flex the tongue either to the right or left of the plane of the disk, thus reversing the direction of rotation of the driven spur gear even though the input drive is unidirectional while zero deflection of the tongue will not produce any motion.

Full details of the present invention are set forth in the following description and in the accompanying drawings.

DESCRIPTION OF INVENTION

Figure 1:
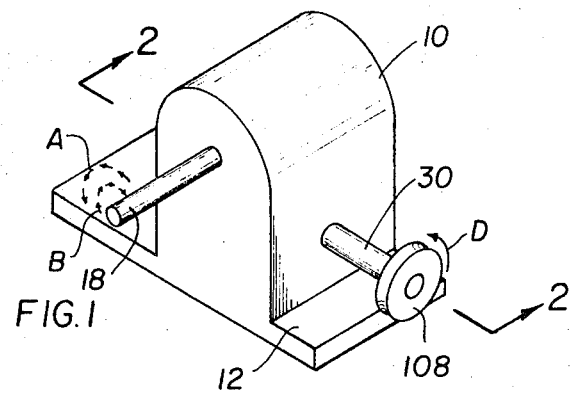
FIG. 1 is a perspective view of the device according to the present invention.

Turning to FIGS. 1–4, the mechanical movement is seen contained in a housing 10 having a semi-circular cross-section sealed to a base 12 capable of resting on or being bolted to a fixed support, not shown. The movement comprises a driven body 14 having the general appearance of a wheel or spur gear in which a plurality of teeth 16 are arranged uniformly about its periphery. The teeth 16 need not extend completely about the body 14, although such an arrangement is to be preferred. The driven body 14 is keyed or otherwise fixed to a shaft 18 suitably journaled with the housing 10 on bearing blocks, sealed bearings or other suitable means, so as to be freely rotatable thereabout in reversible directions indicated by arrows A or B.

Figure 3:
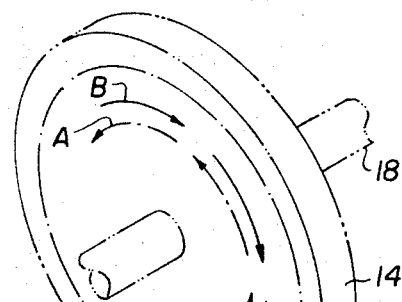
FIG. 3 is an enlarged view of the driving and driven bodies.
Figure 3:
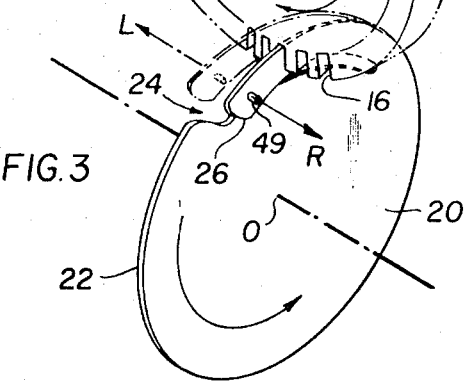
Figure 4:
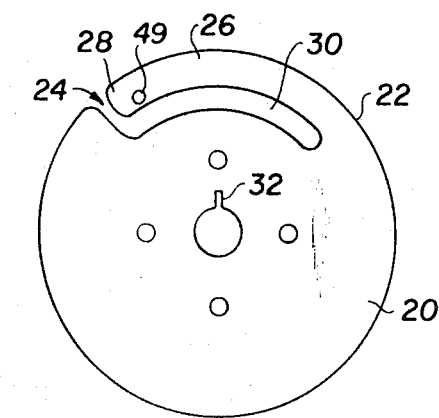
FIG. 4 is a side view enlarged of the driving body.

A driving body 20 having a substantial circular peripheral edge 22 is located adjacent the driven body 14 so that the edge 22 enters between and slidingly engages adjacent flanks of teeth 16. The circular peripheral edge 20 is split as at 24 and is further separable, at least in part, from the main portion of the driving body 20 to form a curved cantilevered portion or tongue 26 having a leading end 28 and a following end connected to the driving body 20 itself. A curved slot 30 separates the tongue 26 from the body 20 making it more or less cantilevered therefrom. The tongue 26 is capable of being flexed out of the plane of the circle normally forming the peripheral edge 22. When flexed, as seen in FIG. 3, to either side of the plane, the outer edge 22 forms a spiral curve about the center O of the body 20. The driving body 20 is also keyed or fastened as at 32 (FIG. 2) to a hollow drive shaft 34 suitably journaled in sealed bearings 36 in housing 10. The shaft 34 is set at an angle (preferably at a right angle) to the axis of the shaft 18.

In the preferred embodiment, the driving body 20 is simply a flat disk having a cut out portion forming the tongue 26. However, a disk is not essential so long as the body is formed with a generally circular peripheral split edge, one end of which being capable of flexure out of the plane of the circle allowing the edge 22 to take on a spiral or hoop configuration.

The driving body 20 is located in a spool 38 having an H-shaped cross-section, the radially interior section of which surrounds the key 32 preventing the driving body 20 from being moved axially of the drive shaft 34.

The radially exterior section of the spool straddles the peripheral edge 22 leaving it free to flex. A plurality of screws 40 secure the spool 38 to the driving body 20 for conjoint rotation. Straddling the H-shaped spool 38 are a pair of L-shaped annular flanges connected together to form a bracket 42 by a cross piece member 44 fastened by screws 46 to the transverse legs 48 of the flanges. The bracket is shiftable axially with respect to the drive shaft 34 by being loosely fit over it, and the cross piece 44 passes through a conforming slot in the H-shaped spool. The cross piece extends in proximity to the peripheral edge 22 of the driving body 20 and is fixedly secured at its center to the leading edge 28 of the tongue by a fastening member 49. The brackets have screws 50 fastened through their axial legs 52 which screws extend through an axial slot 54 in the hollow drive shaft 34 and thread at 56 into a solid rotatable actuating rod 58 slidable within the shaft 34. The axial extent of the slot 54 permits relatively long axial movement of the screw 50 therein while the radial dimension of the slot 54 is, however, only sufficient to receive the screw 50. Thus, axial movement of the actuating rod 58 will cause the flanges 42 to shift axially with respect to the drive shaft 34 while rotation of the drive shaft 34 will cause conjoint rotation of the brackets 42 and rod 58.

Figure 2:
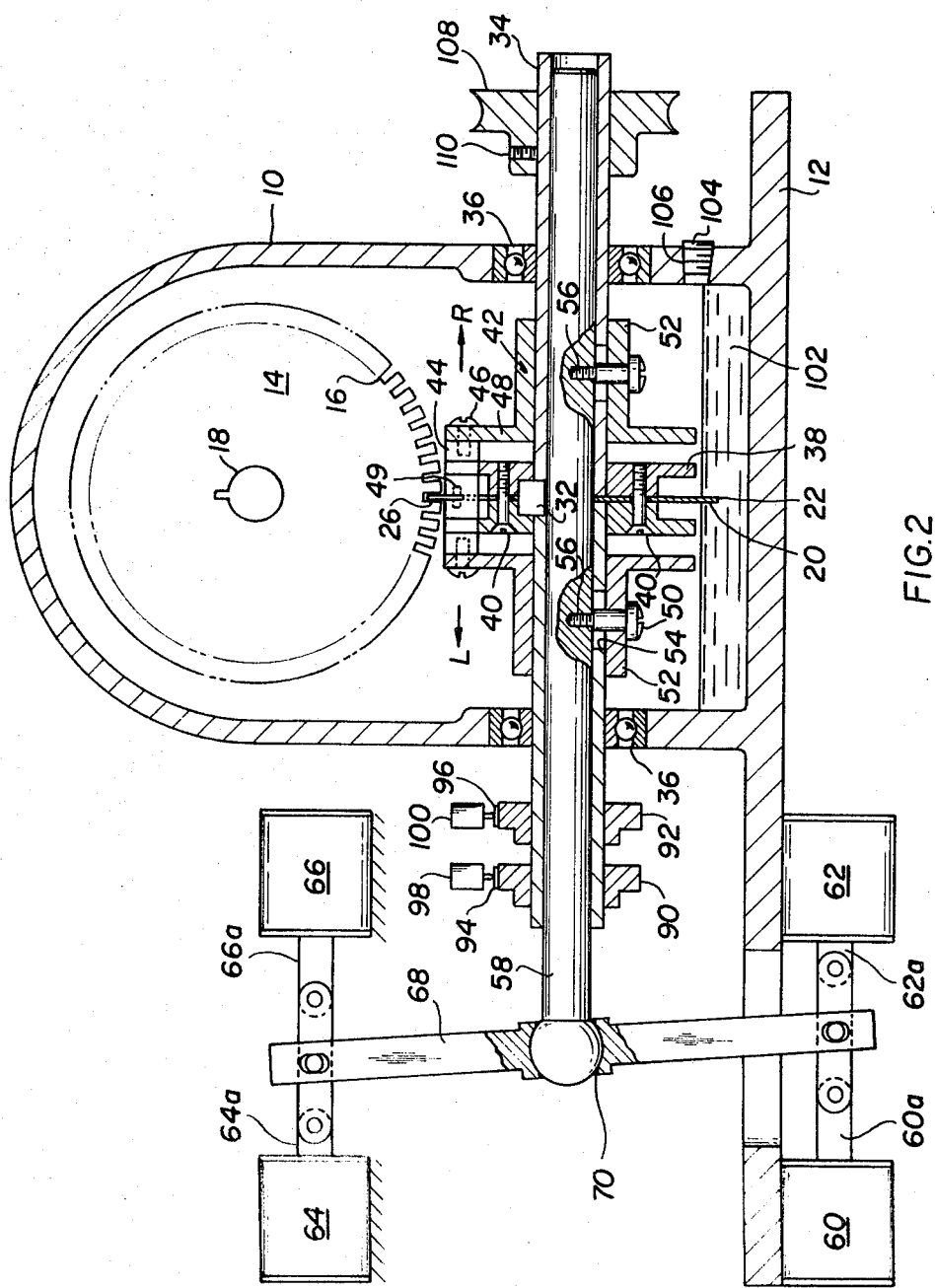
FIG. 2 is a sectional view along line 2—2 showing the interior of the device.

It will then be obvious that rotation of drive shaft 34 will cause conjoint rotation not only of the driving body 20, but the H-shape spool 38 and the connected brackets 42, while axial reciprocation of the actuating rod 58 within the shaft 34 will cause the brackets 42 to shift to the right or left as indicated by arrows R and L in FIGS. 2 and 3, causing the tongue 26 to flex as indicated in FIG. 3 to either side of the neutral position defined by the plane of the circular edge.

While the means for sliftably adjusting the actuating rod 58 may be chosen from any suitably known electrical, electro-magnetic, electro-mechanical, mechanical or fluid system, it is preferred that the system provide certain basic advantages. For example, the system should provide a neutral position when not activated so that the rotary motion is not transmitted from one body to the other; it should provide stable quick and fixedly incremental positioning so that the direction and speed of motion are accurate and it should not interfere with the rotary operation of the drive shaft 34. Such a device is exemplified in FIG. 2 as comprising four solenoid actuators 60, 62, 64 and 66 each having a springless plunger 60a, 62a, 64a, 66a. The solenoid actuators are arranged in spaced pairs in a rectangular array and a yoke-shaped lever bar 68 is linked at its ends to each pair and bearingly connected at 70 to the actuating rod 58 to enable the rod to rotate. The diagonal center of the rectangular array of solenoids is chosen so as to lie on the axis of the actuating rod 58 and the solenoids are symmetrically spaced about it. The length of the actuating rod 58 is also such that when the link between lever bar 68 and rod 58 (i.e., center 70) lies at the diagonal center, then the body 14 is in neutral position with the tongue 26 lying within the plane of the driving body 20.

Figure 5A:
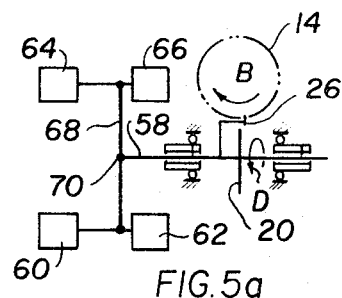
FIGS. 5a to 5c are sequential views showing schematically the operation of the device.
Figure 5B:
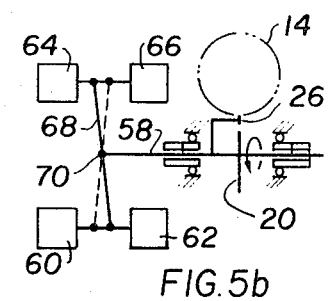
Figure 5C:
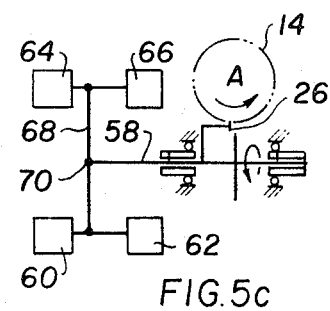

The solenoids are linked to suitable signal or pulse circuits, switches or other conventional means for their selective actuation. By selectively actuating respective pairs of the solenoids, as seen in FIGS. 5a to 5c, the actuating rod 58 may be incrementally shifted right, left or maintained in neutral position. The solenoids are initially wired so that diagonally opposite pairs are normally placed in actuation or out of action. Thus, as seen in FIG. 2 and FIG. 5b (solid lines) solenoids 62 and 64 are activated and their plunger 62a and 64a retracted therein. The link rod 68 extends diagonally between the solenoids; however, because of the symmetry of the array, the central fulcrum 70 remains at the diagonal center of the rectangular configuration. Thus, the link bar 68 remains in neutral position. Reversal of actuation of the other solenoids 60, 66, results only in the reversal of the diagonal position of the lever bar 68 but leaves the fulcrum center 70 at the diagonal center of the array, leaving the driving body 20 in neutral position. In either position, it is necessary to deactivate only one solenoid and activate another solenoid to quickly obtain shifting of the rod 58. As seen in FIG. 5a, activation of both solenoid 62 and 66 pulls the link to the rigth shifting the actuating rod correspondingly, while as seen in FIG. 5c, the activation of solenoids 60 and 64 pulls the lever bar to the left shifting the actuating rod 58 in that direction. Shifting of the actuating rod 58 to the rigth or left causes the bracket 42 to shift the tongue 26 accordingly. Hence, when drive shaft 34 is being rotated in the direction of arrow D, it drives the driven body 14 and shaft 18 and creates a worm action on the teeth of the driven body causing it, too, to rotate in either direction A or B.

Figures 6, 7, 8:
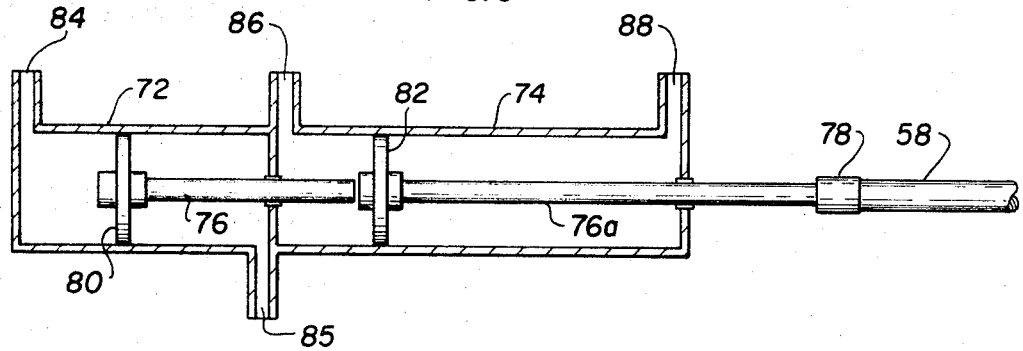
FIG. 6 is tabulation of the actuation program.
FIG. 7 is a view of fluid actuator for use with the present invention.
FIG. 8 is a tabulation of the operations program for the fluid actuator of FIG. 7.

When all the solenoids are deactivated, lever bar 68 is returned to the vertical position coincident with the diagonal center (i.e., in the neutral position). This occurs because of the normal resilient spring loading of the deflected tongue 26 desires to resume its planar position when it is no longer restrained by the lever 68. As the tongue 26 returns to the central neutral position, it shifts the bracket 42 which, in turn, shifts the actuating rod 58, carrying the lever bar 68. Schematically the program for activating the respective solenoids to effect the various positions of the actuating rod 58 is tabulated in FIG. 6.

It will be obvious that by changing the effective length of slot 30 in 22, the pitch angle or spiral curve of the flexed tongue 26 will be varied to ultimately produce varying speeds and duration of rotation in the driven body 14. This variation may also be controlled to some degree by selecting the type of spring material and thickness of 22.

The electrically operable solenoids may be replaced with fluid actuation systems exerting a similar push-pull effect on a lever bar such as bar 68. A preferred form of hydraulic system is, however, shown in FIG. 7. Here a double cylinder, double piston with an in-line piston rod linked directly to the actuating rod 58 is shown. The unit comprises a first cylinder 72 and a second cylinder 74. Piston rods 76 and 76a extend through each, linked at the end 78 to the actuating rod 58. A piston 80 and 82 respectively, are located on the piston rods 76 and 76a within each cylinder 72 and 74. An inlet-outlet port 84 and vent 85 is located at the left end of cylinder 72 while inlet-outlet ports 86 and 88 are located at each of the ends of cylinder 74. To move the actuating rod 58 to the left, fluid under low pressure is admitted through port 88 and venting discharge is allowed through valved ports 84 and 86. To place the actuating rod in neutral position, fluid is admitted under high pressure in port 84 and under somewhat lower pressure through port 88, to balance the rod in the center because rod 76 pushes against piston 82 until the end of the stroke of rod 76. To move the actuating rod 58 to the right, high pressure fluid is admitted through port 86 overcoming the low pressure fluid entering through port 88. The various parameters are tabulated in FIG. 8. In this system, a source of fluid under pressure (an accumulator pump, etc.) is provided, as are suitable valves (manual, solenoid operated, etc.) and control means therefor.

To insure that the shifting of the actuating rod 58 occurs so that the tongue 26 will not flex while it is between the teeth 16 of the body 14, one or a pair of rotary cams 90 and 92 are secured about the shaft 34. The cam 90 is an off-cam while cam 92 is an on-cam. Each cam rides respectively, on a follower arm of 94 and 96 of microswitches 98, 100 which are connected to the control system for the solenoid or valve actuators. The cams are so profiled that the solenoids, for example, may be operated only when the tongue 26 is not between the teeth 16, that is, the solenoids may be operated only when the solid, no flexing, portion of body 20 is between the teeth. Thus, breakage of teeth 16 or tongue 26 is obviated. To further insure proper working, the sealed housing is provided with a reserve of lubricating oil 102 of a depth sufficient to wet the periphery of the body 20. Thus, as the body 20 rotates, lubricating oil is carried to the teeth 16. A removable stop or plug 104 seated within a hole 106 is used to supply and drain the lubricant.

Lastly, the hollow shaft 34 is provided with means for its rotation, which comprises, in the embodiment shown, a pulley 108 secured by a screw 110. A belt, chain or other transmission means connects the pulley to a motor, mechanical pulse generator or similar motive power producer.

In operation, the input drive shaft 34 is rotated unidirectionally by the motive means (not shown( causing conjoint rotation of the body 20. Depending on the direction of rotation desired for the driven body 14, the rod 58 is shifted to the right or left, as seen in FIGS. 5a–5c. It will be noted that the direction of movement of the driven body is reversed only by the axial shifting of the actuating rod 58 and not by reversal of the input rotational direction which remains the same. The input rotational direction, preferably is counterclockwise, as seen in FIG. 2, so that the leading edge 28 of the tongue 26 leads into the teeth 16. Thus, the axial shifting of the tongue in the right or left deflection out of the plane should be in increments of the teeth pitch. Under most instances, a single step pitch deflection allowing the leading edge of the tongue to enter the next succeeding or adjacent tooth space, is preferable. This gives a one to one ratio between the rotation of body 20 and each tooth. On the other hand, a wider deflection of the tongue can produce a larger ratio. Consequently, the speed of rotation of the driven body can be varied without variance of the input speed. Another means by which the speed may be varied is possible by varying the length of the tongue 26. This is accomplished by varying the length of the slot 30 between it and the remainder of the body. The longer the tongue 26, the less is its pitch producing a greater period or duration of the driven body 14. From the foregoing, it will be apparent that the mechanical movement can be easily used as a stepping motor, since each time the leading edge 28 engages the teeth 16, a predefined step is taken.

To be at optimum effectiveness, the drive shaft 34 and the driven shaft 18 must be at relatively large angles to each other. Right or 90° relationship is preferred although significantly lower angles may also work, even though such lesser angles will affect the pitch and duration of the rotation of the driven body.

It will be observed that the present invention provides the advantages and satisfies the earlier mentioned objects. A simple mechanical converter of rotary to rotary motion is obtained wherein the output may be reversed without requiring reversal of the input direction, pitch and duration may be readily controlled and varied, a stepping motor effect can be obtained. Various modifications and changes have been suggested. Others will be obvious to those skilled in this art. Accordingly, the present disclosure is to be taken as illustrative only and not limiting of the invention.

What is claimed is:

1. A mechanical movement comprising a first body having a plurality of teeth arranged about its periphery and adapted to rotate about its central axis, a second body having a split circular peripheral edge adapted to slidingly engage between adjacent teeth of said first body, said second body being rotatable about a central axis offset from the axis of said first body and having one end of its peripheral edge free and capable of flexing out of the plane of the circle to form a substantially continuous spiral, means connected with said second body for flexing said free end, and means for rotating said second body thereby causing said first body to rotate in response to the extent said free end is flexed out of the plane of the circle.

2. A mechanical movement according to claim 1, including means for retaining the free end of said peripheral edge in selected fixed position whereby said portion may be flexed relative distances from the plane of the circle.

3. The movement according to claim 2, wherein the first body comprises a spur gear and said second body comprises a planar disk having a peripherally directed tongue portion in part separable therefrom to form said free end.

4. The mechanical movvement according to claim 3, wherein said disk is mounted on a drive shaft rotatable about its central axis and is straddled by an annular bracket axially slidable on said shaft and jointly rotatable therewith, the free end of said peripheral edge being secured to said bracket and means for shifting said bracket axially of said shaft to flex said tongue.

5. The mechanical movement according to claim 4, wherein said shaft is hollow and the means for shifting said bracket comprises a rod slidable located in said shaft, said shaft having an axial slot, said rod having an annular slot and said bracket having a fastener extending through said axial slot into said annular slot whereby said rod may cause axial shifting of said bracket simultaneously with said shaft causing rotation thereof.

6. The mechanical movement according to claim 5, including means for automatically shifting said actuating rod in incremental steps along the axis of said drive shaft to selective positions wherein said bracket is caused to flex the free end of the tongue to either side of the plane of said disk.

7. The mechanical movement according to claim 6, wherein said means for shifting said actuating rod comprises at least one remotely operable solenoid.

8. The mechanical movement according to claim 7, wherein said means for automatically shifting said rod comprises four solenoids arranged in a rectangular array in opposed pairs, a lever connecting the plungers of the opposed pairs, said lever being linked to said actuating rod whereby on selective actuation of said solenoids said actuating rod is caused to shift.

9. The mechanical movement according to claim 7, wherein said means for shifting said actuating rod comprises a fluid operable piston and cylinder, said piston being operable to incrementally position said actuating rod along the axis of said drive shaft.

10. The mechanical movement according to claim 1, including a sealed housing, a reserve of lubricant within said housing, said second body adapted to contact said lubricant and carry the same to said first body.

11. A mechanical movement comprising a circular driven body and a driving body set at angles to each other, said driven body having a plurality of uniformly spaced teeth about its periphery, said driving body having a generally circular edge adapted to engage between said teeth, said edge having a flexible portion adapted to be deflected from the plane of the circle to form a curve thereof, means for rotating said driving body about the axis of said circle, and means connected with and selectively operable for deflecting said edge to thereby cause said driven body to rotate in response to the extent of deflection of said flexible portion.

12. A mechanical movement according to claim 11, wherein said driven and driving bodies are set at right angle to each other, said driving body being substantially planar, and said flexible edge is deflected into a spiral out of the plane of said driving body.

13. A mechanical movement according to claim 12, including means for selectively maintaining said flexible edge in a fixed position in the plane of said driving body or deflected to either side of the plane of the circle during rotation of said driving body.

* * * * *